United States Patent [19]

Waters

[11] Patent Number: 5,518,406
[45] Date of Patent: May 21, 1996

[54] PERCUTANEOUS ENDOSCOPIC GASTROSTOMY TEACHING DEVICE

[76] Inventor: Tammie C. Waters, 333 E. Clayton St., Baldwyn, Miss. 38824

[21] Appl. No.: 157,733

[22] Filed: Nov. 24, 1993

[51] Int. Cl.⁶ ................................................. G09B 23/28
[52] U.S. Cl. ............................................ 434/267; 434/272
[58] Field of Search .................................. 434/269, 272, 434/267, 262

[56] References Cited

U.S. PATENT DOCUMENTS

| | | | |
|---|---|---|---|
| 2,324,702 | 7/1943 | Hoffmann et al. | |
| 2,704,897 | 3/1955 | Lade | 434/272 |
| 3,339,290 | 9/1967 | Doyle | 434/267 |
| 4,459,113 | 7/1984 | Boscaro Gatti et al. | 434/272 |
| 4,481,001 | 11/1984 | Graham et al. | 434/267 |
| 4,789,340 | 12/1988 | Zikria | 434/272 |
| 4,938,696 | 7/1990 | Foster et al. | 434/267 |
| 5,314,339 | 5/1994 | Aponte | 434/267 |

FOREIGN PATENT DOCUMENTS

| | | | |
|---|---|---|---|
| 646538 | 11/1984 | Switzerland | 434/267 |
| 9314483 | 7/1993 | WIPO | 434/262 |

*Primary Examiner*—Todd E. Manahan
*Attorney, Agent, or Firm*—Phelps Dunbar

[57] ABSTRACT

A model of a human abdominal wall for use in demonstrating or practicing the use and maintenance of percutaneous endoscopic gastrostomy tubes. The model includes two or more layers bound together, the top or "external" layer approximating the feel and texture of human skin. The second layer approximates the feel and resistance of the subcutaneous tissues in the human abdominal wall. A third layer may be added, approximating the feel and resistance of human stomach tissue. Openings are provided which pass completely through the model to accommodate placement of percutaneous endoscopic gastrostomy tubes.

10 Claims, 2 Drawing Sheets

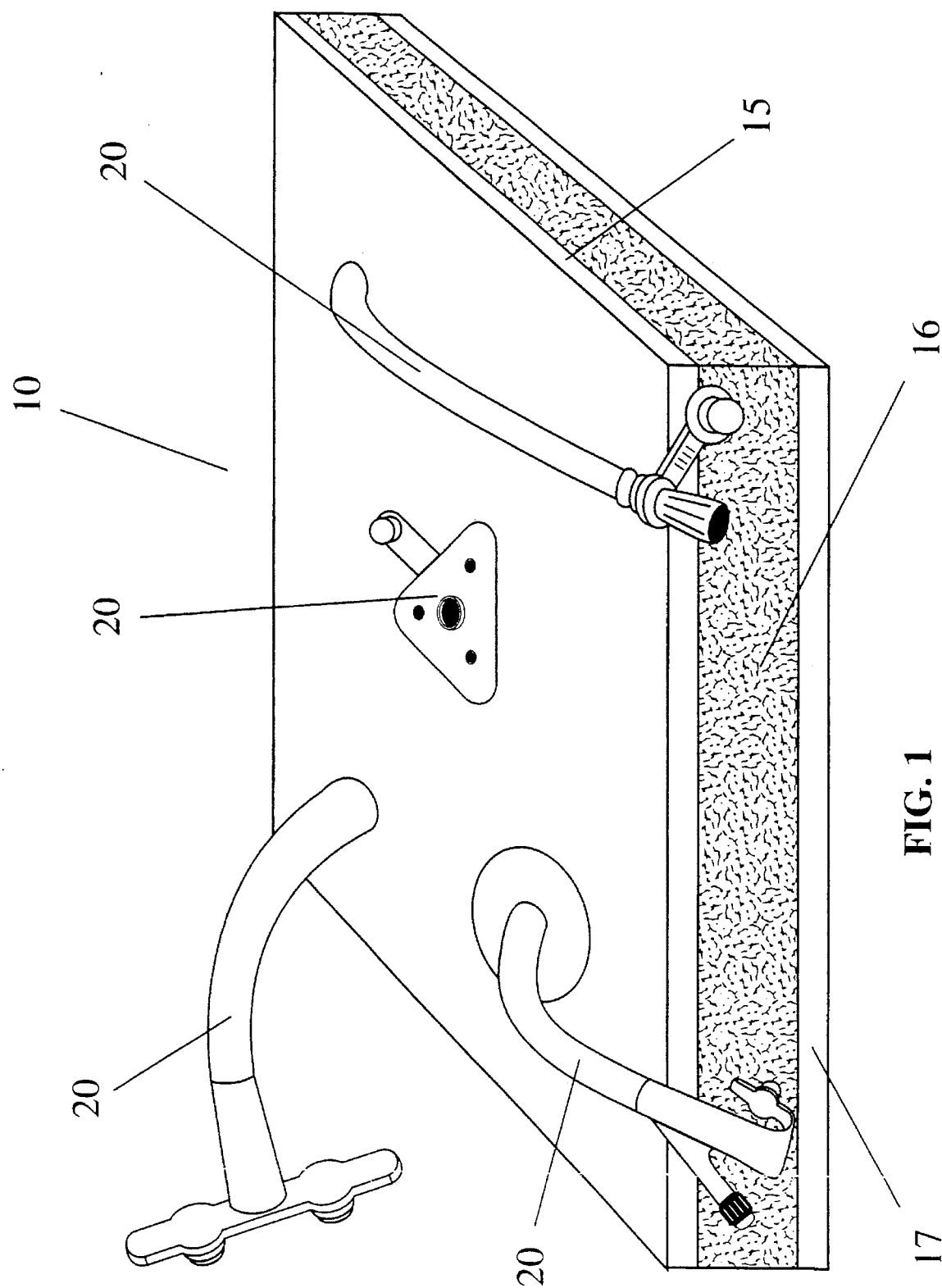

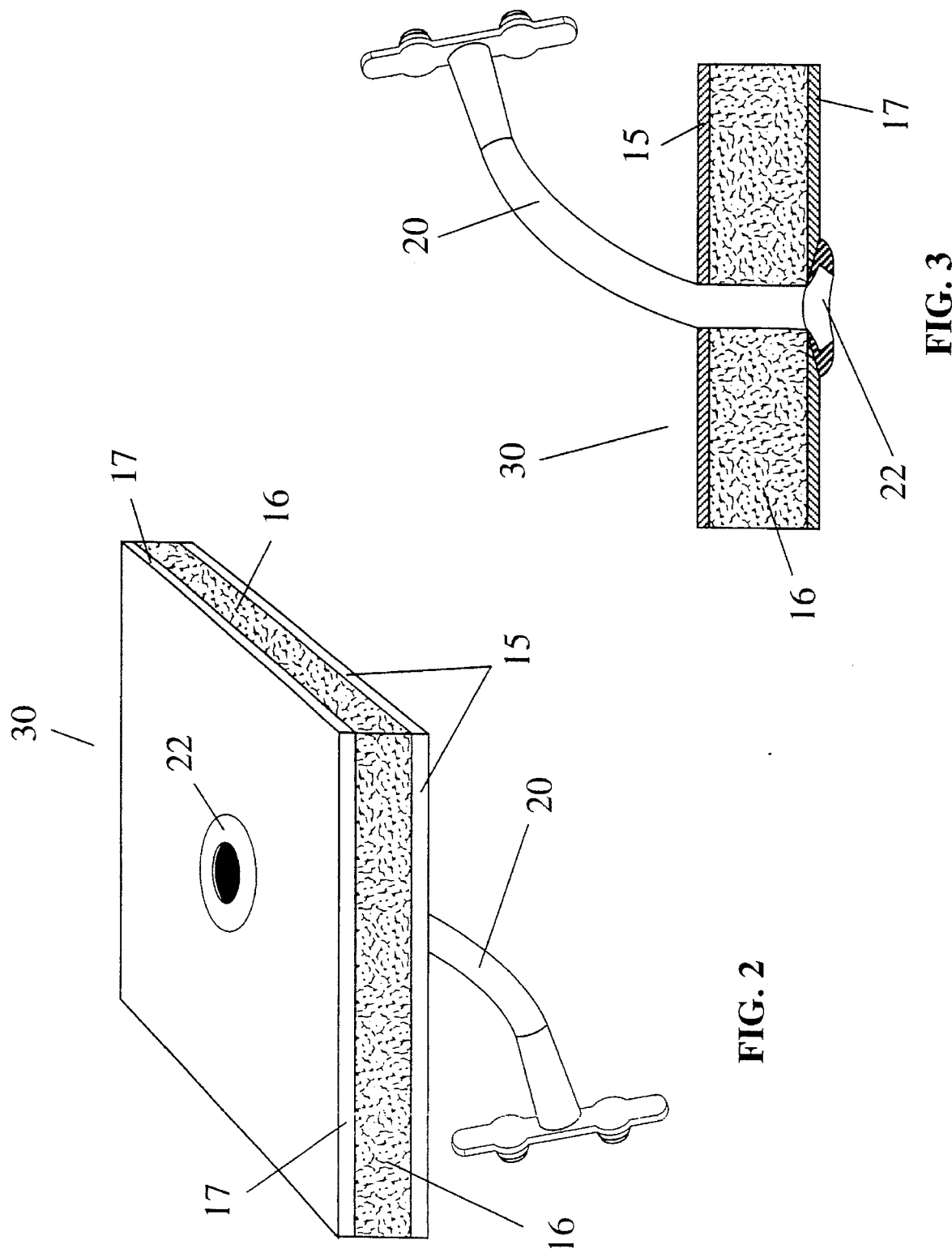

PERCUTANEOUS ENDOSCOPIC GASTROSTOMY TEACHING DEVICE

BACKGROUND OF THE INVENTION

1. Field of the Invention

The present invention refers to a device which has been designed to facilitate the teaching of patients, nurses, or other care providers in the use of Percutaneous Endoscopic Gastrostomy (PEG) tubes, thereby reducing the risks and apprehensions involved in their use.

2. Description of the Prior Art

A wide variety of types of PEG tubes are currently used to facilitate the feeding of patients unable to ingest food orally. PEG tubes are inserted into the stomach of the patient and exit through the abdominal wall. PEG tubes are initially inserted in a hospital setting with trained doctors and nurses responsible for the initial use and maintenance of the tube. However, PEG tubes usually remain in the patient for a substantial period of time, such that it becomes convenient for the use and maintenance of the PEG tube to be routinely handled by the patient, by a home health care professional, or perhaps by a member of the patient's family. However, improper use and maintenance of PEG tubes can lead to serious problems, and can even cause the death of the patient. Such improper use and maintenance of PEG tubes is often the result of a lack of understanding of how the tube operates, which may be a result of poor training. At present the only training for use of PEG tubes is actual observation and experience with patients. While it is possible to achieve a good knowledge of the use and maintenance of PEG tubes in this way, the risks and discomfort to the patient are obvious.

SUMMARY OF THE INVENTION

To reduce the risks and discomfort to patients using PEG tubes, there has been designed the present invention which will facilitate the suitable training of physicians, nurses, patients, home health care professionals and others in the use and maintenance of PEG tubes. To achieve this purpose, the device of the present invention simulates the abdominal wall of a patient in both thickness and texture. Any of the numerous varieties of PEG tubes may be inserted through the simulated abdominal wall of the device in a manner which allows the person being trained to see and feel the PEG tube in its proper orientation, both from the "external" side of the simulated abdominal wall and from the "internal" side of the simulated abdominal wall. The person being trained in the proper use of the PEG tube may practice using and maintaining the PEG tube, without the fear of causing physical or emotional harm to the patient. Additionally, the person being trained, and the patient, can gain an understanding of how the tube functions, which not only facilitates the proper use and maintenance of the tube, but also often provides some comfort to the patient and the patient's loved ones, since PEG tubes are generally much simpler than imagined by laymen.

The subject invention is directed to a portable teaching aid which comprises two or more layers, the top layer or "external" layer being manufactured from a material which approximates the feel and texture of human skin. The layer adjacent to the external layer is approximately the thickness of the abdominal wall through which the PEG tube must pass to reach the patient's stomach. This layer should also approximate the feel or "give" of the fatty tissues present in the abdominal wall through which the PEG tube must pass. A third layer may be added if desired, which represents the wall of the patient's stomach. The teaching device may be of sufficient size to allow the placement of several different types of PEG tubes through the device. Such a device would be of use in training physicians and nurses in the use and maintenance of the various types of PEG tubes. When the teaching device is used to facilitate training of the patient, home care professional, or member of the patient's family, a smaller version of the device may be used, containing the particular type of PEG tube used with the patient in question. Companies attempting to market a particular type of PEG tube may also find the smaller version of the device useful in demonstrating how their particular PEG tube functions.

BRIEF DESCRIPTION OF THE DRAWINGS

FIG. 1 is a perspective view of a teaching device in accordance with the subject invention accommodating several different types of PEG tubes, showing the external side of the device.

FIG. 2 is a perspective view of a teaching device in accordance with the subject invention accommodating a single type of PEG tube, showing the internal side of the device.

FIG. 3 is a cross sectional view of a teaching device in accordance with the subject invention accommodating a single type of PEG tube.

DETAILED DESCRIPTION OF THE PREFERRED EMBODIMENTS

The teaching device of the subject invention is illustrated in FIGS. 1–3. In FIG. 1 the device is identified generally by the numeral 10. The teaching device 10 comprises two or more generally flat layers of material which are fixed together. The first layer 15 is made of a material which approximates the feel, texture and resiliency of human skin, and is preferably approximately 1/16th of an inch thick, although it may range from 1/64th of an inch to 1/2 of an inch thick. The first layer 15 may be manufactured from any material which suitably exhibits the appropriate feel, texture and resiliency, keeping in mind that the purpose of the teaching device is to approximate the actual feel of a patient using a PEG tube. Preferred materials of construction for the first layer 15 include polyurethane foam sheeting, or a material commonly known as C-flex. The first layer 15 is fixably attached to a second layer 16 using any of a variety of methods, including the use of adhesives, or if preferred, mechanical fasteners. However, the use of mechanical fasteners may reduce the extent to which the teaching device approximates the patient using a PEG tube.

The second layer 16 may be made of a material which approximates the feel, texture and resiliency of the fatty tissues of the abdominal wall of the typical patient using a PEG tube, and is preferably approximately 3/4ths of an inch thick, although it may range from 1/4th of an inch to 2 inches thick. The second layer 16 may be manufactured from any material which suitably exhibits the appropriate feel, texture and resiliency of the fatty tissues of the abdominal wall, keeping in mind that the purpose of the teaching device is to approximate the actual feel of a patient using a PEG tube. Preferred materials of construction for the second layer 16 include urethane foam or poly foam. The relationship between the first layer 15 and the second layer 16 is best seen in FIG. 3 which is a cross sectional view of the teaching device.

The second layer 16 may be fixably attached to a third layer 17 using any of a variety of methods, including the use of adhesives, or if preferred, mechanical fasteners. However, the use of mechanical fasteners may reduce the extent to which the teaching device approximates the patient using a PEG tube. The third layer 17, representing the stomach wall of the patient, may not be appropriate for all applications of the teaching device. For certain teaching applications the use of a third layer 17 is clearly desired. Where the teaching device is used to demonstrate the use and maintenance of PEG tubes to physicians and nurses the third layer 17 may improve the device and the effectiveness of the demonstration. However, a third layer 17 may tend to unnecessarily confuse some patients or laymen attempting to learn about the use and maintenance of PEG tubes and may be left off of teaching devices used for these purposes if desired. The third layer 17 may be made of a material which approximates the characteristics of the stomach wall of the patient, and is preferably approximately 1/8th of an inch thick, although it may range from 1/16th of an inch to 3/4th of an inch thick. The third layer 17 may be manufactured from any material which suitably exhibits the appropriate characteristics of the stomach wall, keeping in mind that the purpose of the teaching device is to approximate the actual feel of a patient using a PEG tube. Preferred materials of construction for the third layer 17 include polyurethane foam sheeting, or a material commonly known as C-flex. The relationship between the second layer 16 and the third layer 17 is best seen in FIG. 3 which is a cross sectional view of the teaching device.

The teaching device 10 illustrated in FIG. 1 contains a number of different types of PEG tubes 20 passing through the device 10. The external end of the PEG tube 20 should be on the side of the teaching device 10 which includes first layer 15. The internal end 22 of the PEG tube 20 should be adjacent the side of the teaching device 10 which includes third layer 17, if such a layer is used, or second layer 16, if no third layer 17 is used. The teaching device 10 should be of a size sufficient to accommodate a number of different types of PEG tubes, but be small enough to be easily portable. Typically a teaching device 10 may be approximately one square foot in area, although such a device may range from 1/4th of a square foot to nine square feet in area.

The use of a teaching device 10 containing multiple PEG tubes 20 may not be appropriate for all applications of the teaching device 10. For certain teaching applications the presence of multiple PEG tubes 20 is clearly desired. Where the teaching device is used to demonstrate the use and maintenance of PEG tubes to physicians and nurses the presence of multiple PEG tubes 20 of differing types may improve the device and the effectiveness of the demonstration. However, multiple PEG tubes 20 may tend to unnecessarily confuse some patients or laymen attempting to learn about the use and maintenance of a particular type of PEG tube. In such situations a teaching device of the type illustrated in FIG. 2 is the appropriate choice. In FIG. 2 the teaching device is generally referred to by numeral 30 and is comprised of first layer 15 and second layer 16. In this embodiment no third layer 17 has been used, since this teaching device will likely be used with patients and laymen. In addition, only one PEG tube 20 has been inserted into the teaching device 30. This PEG tube 20 should be of the same type used by the patient for which the teaching device 30 is being used. The teaching device 30 need only be of a size sufficient to accommodate a single PEG tube. Typically a teaching device 30 may be approximately 1/4th square foot in area, although such a device may range from a few square inches to several square feet in area.

In preparing the teaching device 10 (or 30) for use, a small cut should be made through all layers of the device to allow insertion of a PEG tube 20. Alternatively, small holes may be bored through all layers of the teaching device 10 (or 30) of the appropriate size to accommodate particular types of PEG tubes 20. The internal end 22 of PEG tube 20 should fit snugly against the second layer 16 of the teaching device 10 (or 30), or against the third layer 17, if one is used. The teaching device 10 (or 30) should fit snugly around the PEG tube 20 as the tube passes through the teaching device. This fit should approximate the feel of a PEG tube passing through the abdominal wall of the patient, to give maximum effectiveness to the demonstration of the use and maintenance of PEG tubes using the teaching device.

While the invention had been described with respect to certain preferred embodiments, it is apparent that various changes can be made without departing from the scope of the invention as defined by the appended claims.

What I claim is:

1. A teaching device and one or more percutaneous endoscopic gastrostomy tubes, for teaching the use and maintenance of percutaneous endoscopic gastrostomy tubes, said teaching device and one or more percutaneous endoscopic gastrostomy tubes comprising;

two generally thin and flat sheets of material, wherein one of said sheets is formed from a material that simulates human skin tissue, and the other of said sheets is formed from a material that simulates human abdominal tissue between the skin and stomach;

means for securing said two sheets together in a face to face relationship; and one or more percutaneous endoscopic gastrostomy tubes;

means for inserting said one or more percutaneous endoscopic gastrostomy tubes through said two sheets secured together in said face to face relationship.

2. A teaching device and one or more percutaneous endoscopic gastrostomy tubes, as in claim 1 wherein said means for securing comprises an adhesive material applied between said two sheets.

3. A teaching device and one or more percutaneous endoscopic gastrostomy tubes, as in claim 1 wherein said means for inserting comprises linear cuts extending through said two sheets, said cuts each being of sufficient dimension to snugly accommodate a percutaneous endoscopic gastrostomy tube.

4. A teaching device and one or more percutaneous endoscopic gastrostomy tubes, as in claim 1 wherein said means for inserting comprises holes bored through said two sheets, said holes each being of sufficient dimension to snugly accommodate a percutaneous endoscopic gastrostomy tube.

5. A teaching device and one or more percutaneous endoscopic gastrostomy tubes, as in claim 1 wherein said sheet formed from a material that simulates human skin tissue is between 1/32nd and 1/8th of an inch thick, and said sheet formed from a material that simulates human abdominal tissue between the skin and stomach is between 1/2 and 2 inches thick.

6. A teaching device and one or more percutaneous endoscopic gastrostomy tubes, for teaching the use and maintenance of percutaneous endoscopic gastrostomy tubes, said teaching device comprising;

three generally thin and flat sheets of material, wherein one of said sheets is formed from a material that simulates human skin tissue, another of said sheets is formed from a material that simulates human abdominal tissue between the skin and stomach, and the third of said sheets is formed of a material that simulates human stomach wall tissue;

means for securing said three sheets together in a face to face relationship, whereby said sheet formed from a material that simulates human abdominal tissue between the skin and stomach is located between the other two said sheets; and one or more percutaneous endoscopic gastrostomy tubes;

means for inserting said one or more percutaneous endoscopic gastrostomy tubes through said three sheets secured together in said face to face relationship.

7. A teaching device and one or more percutaneous endoscopic gastrostomy tubes, as in claim 6 wherein said means for securing comprises an adhesive material applied between said three sheets.

8. A teaching device and one or more percutaneous endoscopic gastrostomy tubes, as in claim 6 wherein said means for inserting comprises linear cuts extending through said three sheets, said cuts each being of sufficient dimension to snugly accommodate a percutaneous endoscopic gastrostomy tube.

9. A teaching device and one or more percutaneous endoscopic gastrostomy tubes, as in claim 6 wherein said means for inserting comprises holes bored through said three sheets, said holes each being of sufficient dimension to snugly accommodate a percutaneous endoscopic gastrostomy tube.

10. A teaching device and one or more percutaneous endoscopic gastrostomy tubes, as in claim 6 wherein said sheet formed from a material that simulates human skin tissue is between $1/32$nd and $1/8$th of an inch thick, said sheet formed from a material that simulates human abdominal tissue between the skin and stomach is between $1/2$ and 2 inches thick, and said sheet formed from a material that simulates human stomach wall tissue is between $1/16$th and $1/2$ inch thick.

* * * * *